June 30, 1936. W. RICHTER 2,045,802
ARC WELDING SHIELD
Filed June 19, 1935
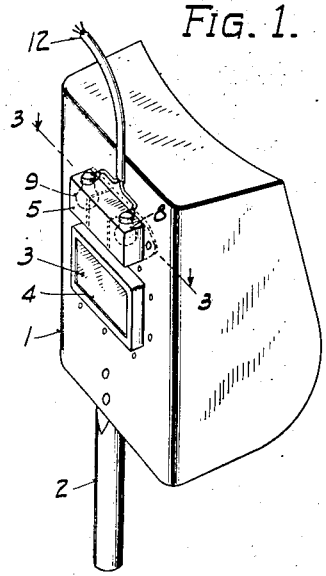
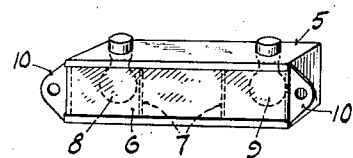
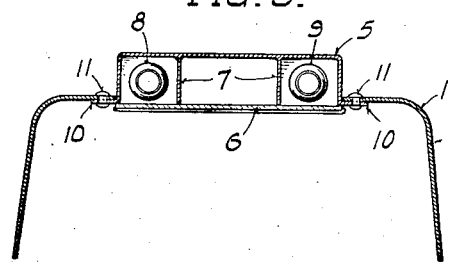
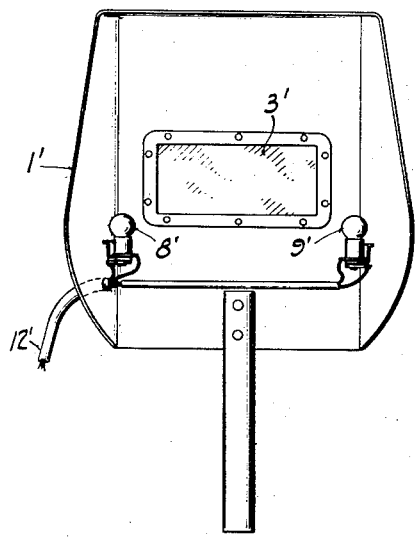
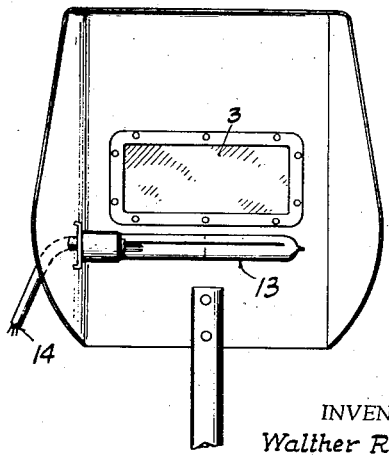
INVENTOR.
Walther Richter
BY
ATTORNEY.

Patented June 30, 1936

2,045,802

UNITED STATES PATENT OFFICE 2,045,802

ARC WELDING SHIELD

Walther Richter, Wauwatosa, Wis., assignor to A. O. Smith Corporation, Milwaukee, Wis., a corporation of New York Application June 19, 1935, Serial No. 27,302

7 Claims. (Cl. 177—311)

This invention relates to an arc welding shield.

The object of the invention is to provide a simple, efficient construction for indicating to the welding operator by visual means attached to the shield the length of the welding arc.

Other objects will appear hereinafter.

This application constitutes a continuation in part of copending applications, Serial No. 728,886, filed June 4, 1934 for Welding arc voltage indicator, Serial No. 729,590, filed June 8, 1934 for Arc length indicator, and Serial No. 27,301, filed June 19, 1935, for Voltage indicator.

The preferred embodiment of the invention is illustrated in the accompanying drawing in which:

Figure 1 is a perspective view of a welding shield or hood;

Fig. 2 is a perspective view of the signal box which is attached to the hood;

Fig. 3 is a transverse section on line 3—3 of Fig. 1;

Fig. 4 is an inside rear view of a modified form of the device; and

Fig. 5 is a similar view of another modified form.

The invention is particularly adapted for manual arc welding to indicate to the operator whether he is holding his arc too long or too short. The invention employs visual means for indicating the arc length to the operator. The indications are preferably given by light sources although other visual means such as a flag movement or shutter movement may be employed.

In Fig. 1 the welding shield or hood 1 is of conventional construction for holding before the face of the operator. The hood 1 preferably has a handle 2 for this purpose, although other means of support may be provided.

In the front of the shield 1 is a window 3 in which the usual special protective glass 4 is placed, and through which the operator observes the welding arc.

Attached to the shield 1 above the window 3 is a small box 5 made of sheet metal or other suitable material and having the side facing the operator formed of glass 6. The box 5 is divided by partitions 7 into two compartments arranged at the ends. Light bulbs 8 and 9 are arranged in the respective compartments, the device being mounted to dispose the light bulbs 8 and 9 at opposite sides of the shield 1.

The box 5 has two flanges 10 through which rivets or bolts 11 pass to attach the box to the shield. The box 5 may be placed inside the shield 1, but it is here shown mounted on the outside, the shield being provided with an opening in its face corresponding to the position of the glass 6 so that the operator can observe the lights in the box 5.

The position of the signal box is such that the operator will become conscious of the signal while watching the arc through the window 3, the signal then being outside the direct line of vision of the operator but within his range of vision.

The light bulbs 8 and 9 are connected by leads 12 to respond to changes in arc voltage or current or other suitable characteristic of the arc or arc circuit. Various electrical circuits have been proposed, as set forth in the copending applications above referred to. In application, Serial No. 729,590, one bulb remains at constant brilliancy as a standard while the other is caused to fluctuate in brilliancy above and below the standard, depending upon whether the arc grows longer or shorter than the desired arc length. In application Serial No. 27,301, both bulbs are dark when the arc is being maintained in the desired range of arc voltage. If the arc gets too short, one bulb lights, while if the arc gets too long the other bulb lights. Only one bulb is on at a time and each bulb increases in brilliancy gradually in proportion to the deviation of the arc from the desired length in the direction being indicated. Where this varying brilliancy of the lights is not desired it is possible to employ a relay circuit such as that set forth in Patent No. 1,877,969 issued to the present inventor, in which the respective lights are merely switched on or off in accordance with variations in the arc characteristics indicated.

The embodiment illustrated in Fig. 4 has the bulbs 8' and 9' mounted in sockets within the shield 1', one at either side and just below the window 3'. Leads 12' connect the bulbs to the actuating or energizing circuit.

In Fig. 5 another modification is shown, utilizing preferably the circuit described in application Serial No. 728,886, above referred to. In this embodiment a neon tube 13 is mounted in the shield 1 and connected by leads 14 to respond to changes in arc length. Neon tubes might be used in place of the bulbs 8 and 9 in Figs. 1 to 4 also.

Instead of employing lights for signal means other signal means may be used within the range of vision of the operator but out of his direct line of vision while observing the arc. For instance a shutter may be employed which shuts off a portion of window 3 in one corner in response to a high arc and in the other corner in response to a low arc, or such a shutter may open the view to a constant light source.

The invention has been found to be particularly valuable in hand arc welding since in general the welder does not observe the arc from a direct horizontal position but rather from a nearly vertical position, in order to observe the penetration and other welding characteristics of his arc. Also, in welding in deep grooves the welder is unable to properly judge the arc length. The present invention provides a simple but effective means for indicating to the welder the length of the arc without interrupting his observation of other welding characteristics.

I claim:

1. A welding shield for use in arc welding comprising a hood for protecting the welder from the arc, a window therein through which the welder may observe the welding operations, and means attached to said hood and disposed to give a visible signal to the welder.

2. A portable welding shield adapted to be supported by a welding operator comprising a hood for protecting the welder from the arc, a protective window therein through which the welder may observe the welding operations, and visual indicating means within such hood and positioned without the direct line of vision employed by the welder to observe said arc through said window for indicating signals to said welder, said signals being recognizable by said welder without diverting his attention from said arc.

3. A welding shield for use in arc welding comprising a hood for protecting the welder from the arc, a window therein through which the welder may observe the welding operations, and a light source attached thereto and disposed to give a visible signal to the welder within said hood.

4. In combination with a welding hood having a window therein for observing an electric welding arc, means attached to said hood including a plurality of light sources disposed within the range of vision of the welder to give visible signals to the welder.

5. A signal device for attachment to a welding hood having a window therein for observing an electric welding arc comprising, a box divided into a plurality of compartments, each compartment having an opening on the side facing the welder, and a light source in each compartment adapted to give visible signals to the welder.

6. A portable welding shield for employment by a welder comprising a hood for protecting the welder from the arc, a protective window therein through which the welder may observe the welding operations, and visual indicating means arranged laterally of said window for displaying signals interiorly of said hood.

7. In combination with a welding hood having a window therein for observing an electric welding arc, means attached to said hood including a neon tube disposed within the range of vision of the welder while observing his welding arc through said window to give a visible signal to the welder.

WALTHER RICHTER.